(No Model.) W. G. ALLEN. 5 Sheets—Sheet 3.
MACHINE FOR MAKING RIVETS, THUMB TACKS, OR LIKE ARTICLES.
No. 578,850. Patented Mar. 16, 1897.
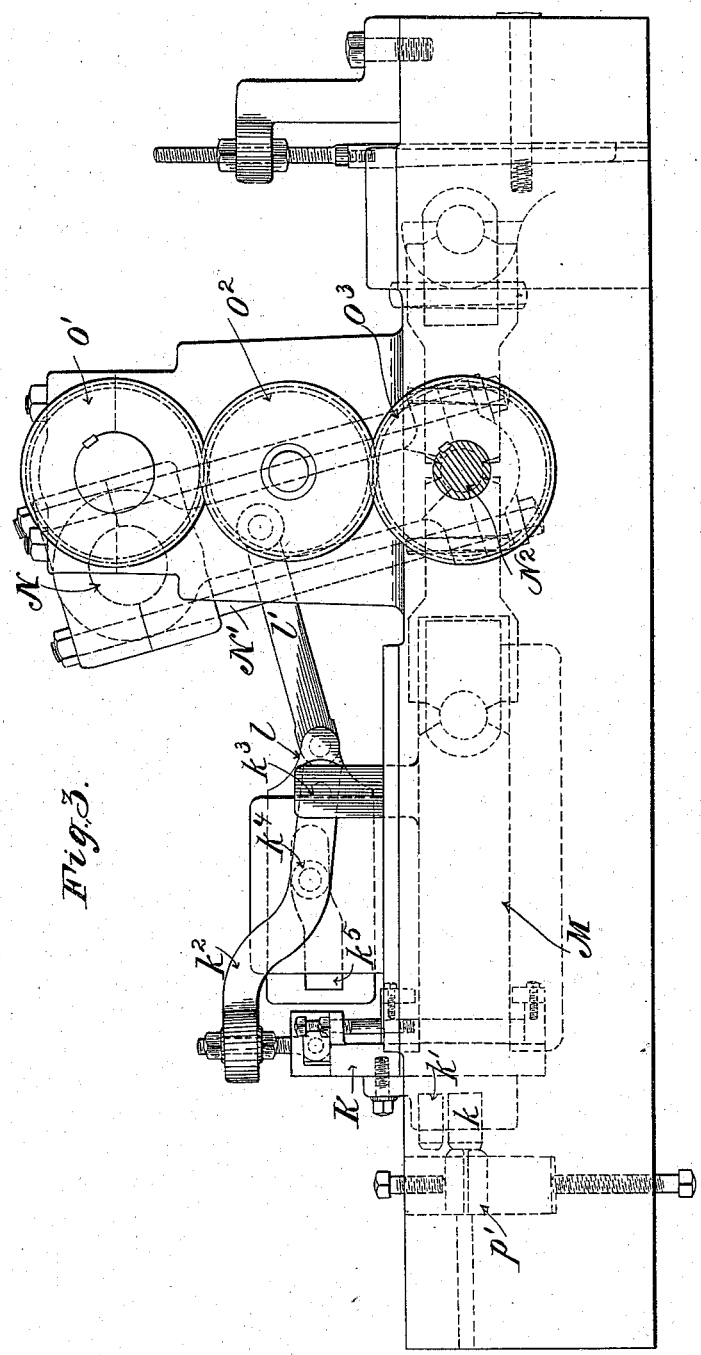
Witnesses.
Inventor.
William G. Allen,
by Pollok and Mauro
his attorneys.

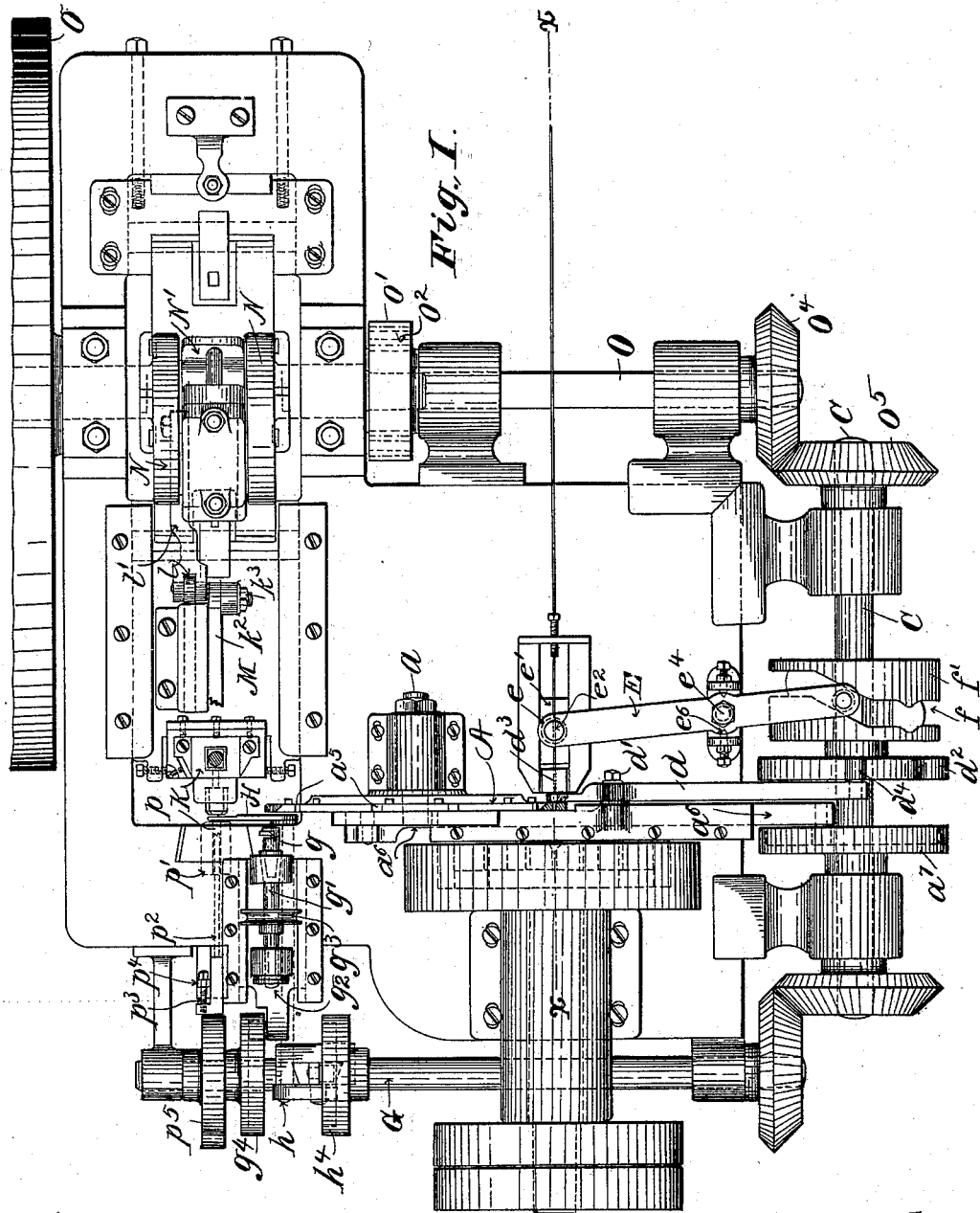

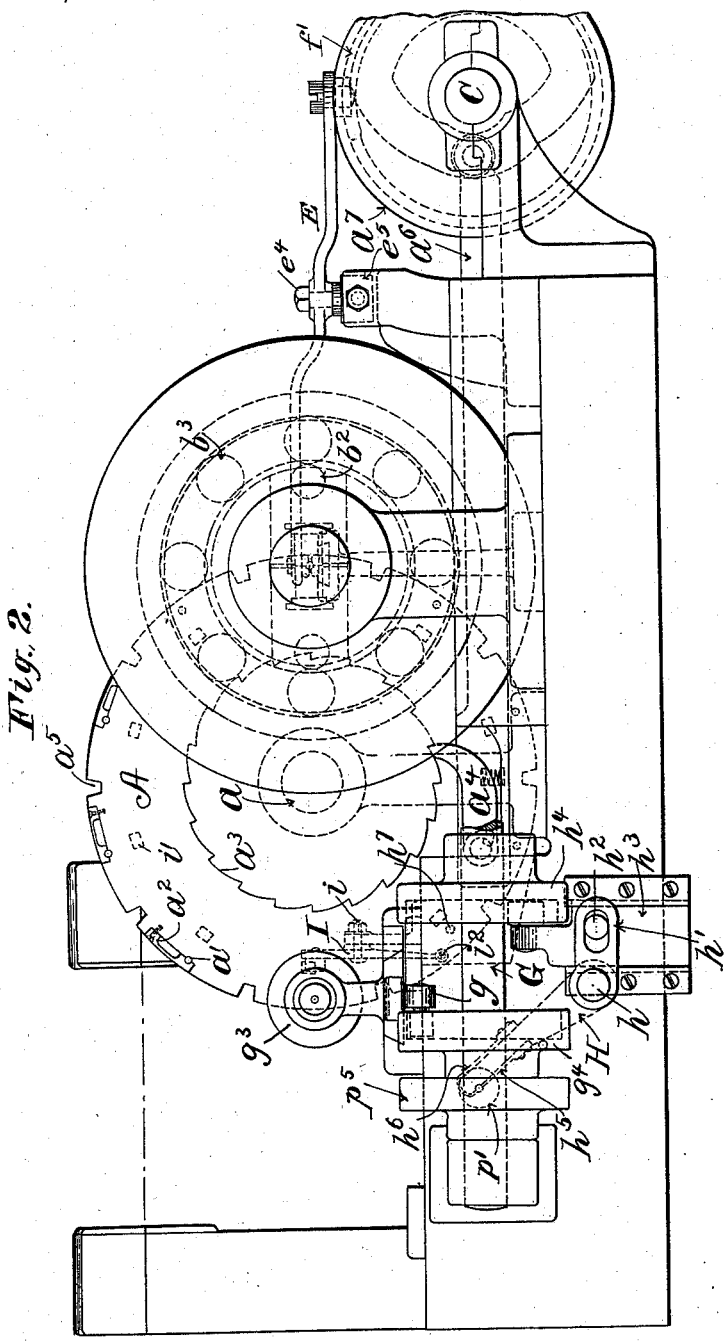

(No Model.) 5 Sheets—Sheet 4.
W. G. ALLEN.
MACHINE FOR MAKING RIVETS, THUMB TACKS, OR LIKE ARTICLES.
No. 578,850. Patented Mar. 16, 1897.
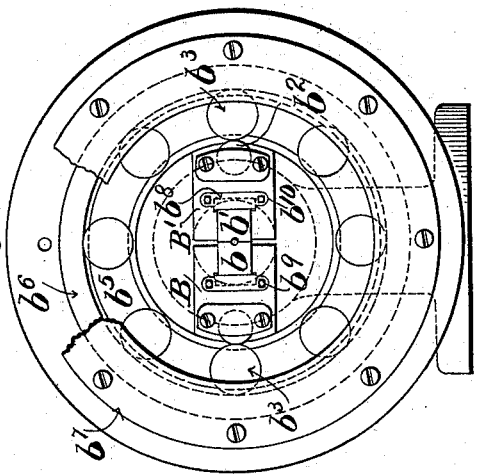
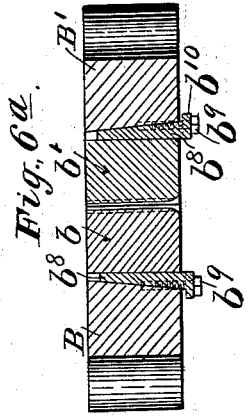
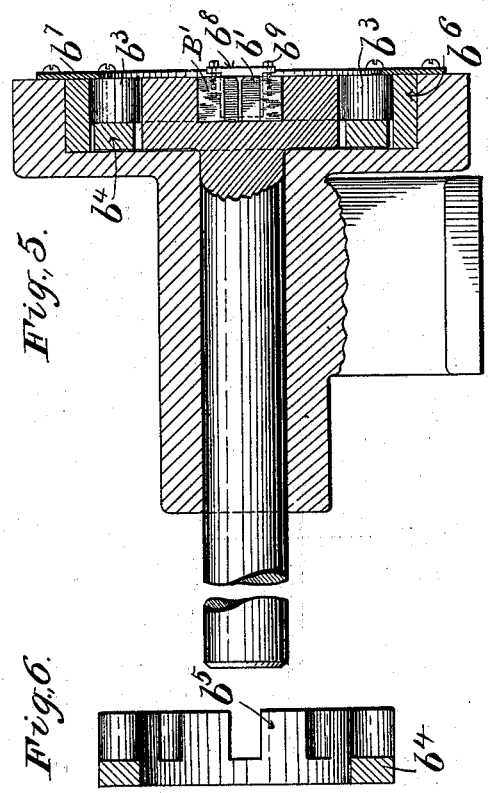
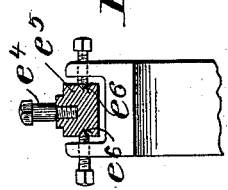
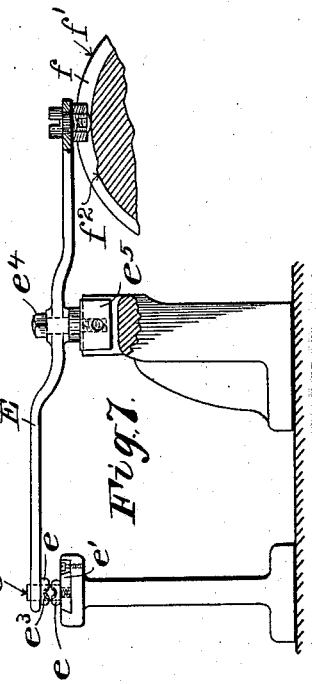
Witnesses.
Inventor.
William G. Allen
by Pollard Mauro,
his attorneys (No Model.) 5 Sheets—Sheet 5.
W. G. ALLEN.
MACHINE FOR MAKING RIVETS, THUMB TACKS, OR LIKE ARTICLES.
No. 578,850. Patented Mar. 16, 1897.
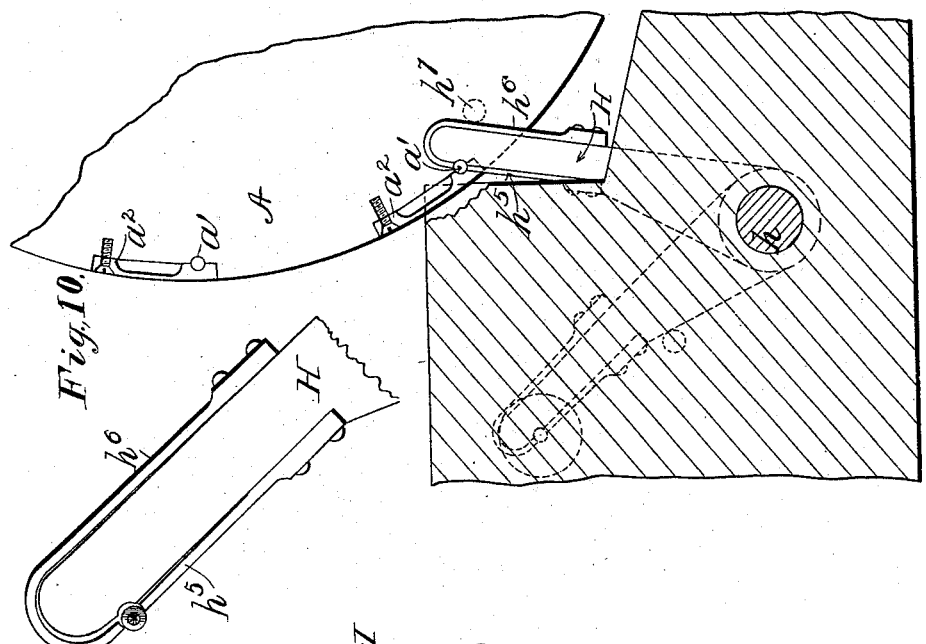
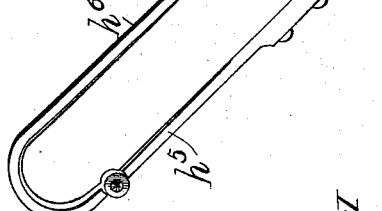
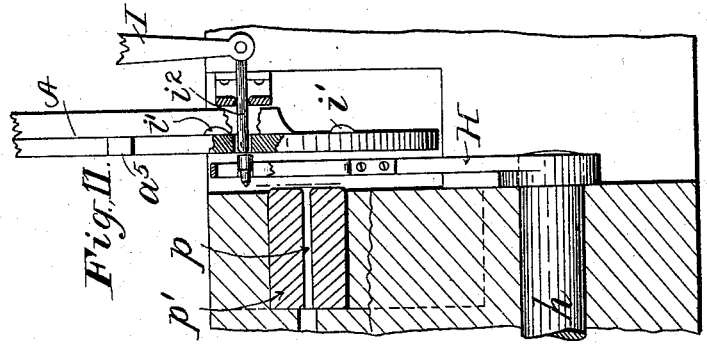
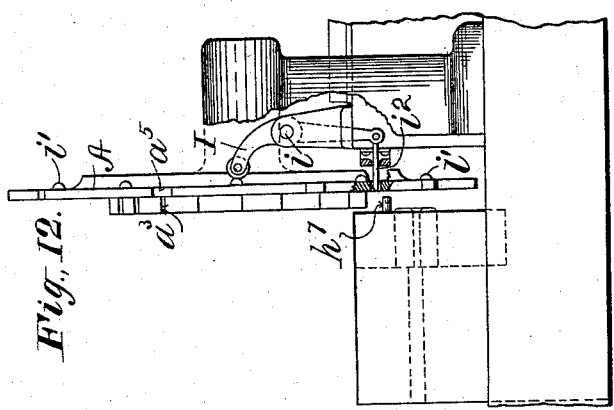

UNITED STATES PATENT OFFICE.

WILLIAM G. ALLEN, OF HARTFORD, CONNECTICUT.

MACHINE FOR MAKING RIVETS, THUMB-TACKS, OR LIKE ARTICLES.

SPECIFICATION forming part of Letters Patent No. 578,850, dated March 16, 1897.

Application filed May 9, 1896. Serial No. 590,945. (No model.)

*To all whom it may concern:*

Be it known that I, WILLIAM G. ALLEN, of Hartford, Connecticut, have invented a new and useful Improvement in Machines for Making Rivets, Thumb-Tacks, or Like Articles, which is fully set forth in the following specification.

This invention has reference, primarily, to the manufacture of articles similar in general form to rivets, but which from peculiarities of their structure cannot be made in the manner and by the means employed for the manufacture of ordinary rivets. As an example of such articles the common thumb-tack used by draftsmen may be taken. Tacks of substantially this shape are also employed in metallic two-part buttons, and other uses are or may be made of them.

Tubular rivets having heads relatively large in proportion to their shanks form a further example of articles to which this invention relates.

I have devised a machine by which articles of the character described may be rapidly and economically manufactured with a perfection of finish hitherto unattained, the operations of the machine being entirely automatic from the moment the raw material or stock is fed thereto until the finished article is produced.

In this machine, if a solid tack or rivet is to be made the wire stock is fed forward by suitable devices and the end swaged by swaging-dies. It is then withdrawn and sheared or cut off, forming a blank of the proper length, a portion of the blank having been reduced. Another motion of the feed delivers the blank to a carrier, which is preferably in the form of a disk having holes near its periphery, the holes being equidistant and of suitable size to receive a blank, but the carrier may be in any other suitable form. This carrier is intermittently moved step by step. It carries the blank first to a pointer and afterward delivers it to a second carrier, which carries it to a header. In making tubular rivets, however, the pointing operation is omitted.

In the accompanying drawings I have for purposes of illustration shown a machine, the same being a part of the invention specifically adapted to making pointed rivets or tacks having solid shanks; but it will be obvious that the main features or elements of the mechanism may be used in making tubular rivets.

In said drawings, Figure 1 represents a plan view of the machine. Fig. 2 is an enlarged end view from the left of Fig. 1, parts being omitted. Fig. 3 is a side elevation of the heading mechanism shown at the top of Fig. 1. Fig. 4 is a face view of the swaging mechanism. Fig. 5 is a sectional view thereof. Fig. 6 is a detail of part of the swaging mechanism. Fig. $6^a$ is a horizontal section through the dies of the swaging mechanism in the position shown in Fig. 4. Figs. 7 and 8 are details of the feeding devices. Fig. 9 is a detail of the auxiliary carrier for transferring the pointed swaged blank to the heading mechanism. Fig. 10 is another detail showing the relative location of the main disk carrier and the auxiliary carrier at the instant the blank is transferred from the former to the latter. Fig. 11 is a sectional view at right angles to Fig. 10, illustrating clearly the operation of the parts in effecting the transfer from one carrier to the other. Fig. 12 is an edge view of the disk carrier and adjacent parts, showing particularly the device for ejecting the pointed swaged blanks from said carrier. Fig. 13 shows one of the blanks after it has been operated upon by the swaging and pointing mechanisms and also a finished thumb-tack, and Fig. 14 shows a tubular rivet.

In the drawings, A represents the main carrier for the blanks, being a large disk mounted on a short shaft $a$, properly supported in bearings, said disk having near its periphery a series of holes $a'$, of a size to receive a blank. Alongside of each hole is a spring-finger $a^2$, serving as a holding device to prevent the blank dropping out. The carrier is turned intermittently by a ratchet $a^3$ on one side of the disk and a pawl $a^4$, carried by a slide $a^6$, actuated by a cam $a^7$ on shaft C. In the machine illustrated the distance between adjacent holes $a'$ is equal to the space through which the carrier is turned by two movements of the pawl, and midway between two adjacent holes the periphery of the disk is notched or cut away, as at $a^5$, for a purpose to be presently explained.

The blanks are fed into the machine on the line $x\,x$, and the holes $a'$ and notches $a^5$ successively register with this line as the carrier is intermittently rotated.

Behind the carrier is the swaging device of a rotary type. The dies $b\,b'$ meet in the line $x$, so that the stock or blank being fed through one of the apertures in the carrier will be in proper position to be acted on by the dies. Each die sets in a reciprocatory die block or slide B or B', and each of these blocks has, at the end remote from the die, a roller $b^2$, which receives the successive impacts of the rollers $b^3$, held in proper relative position by a suitable annular frame $b^4$, (see Fig. 6,) having projections $b^5$ located between the rollers. These rollers are surrounded by a hard-steel ring $b^6$, against which they impinge when rollers $b^2$ come in contact therewith, rollers $b^3$, frame $b^4$, and ring $b^6$ all being retained in place in the shell or casing by a ring or washer $b^7$, secured thereto.

The dies $b\,b'$ rest at their inner ends against wedge-shaped blocks $b^8$, (see Fig. 6$^a$,) adjustable by means of screws $b^9$, passing through ears $b^{10}$ thereof and engaging the die-blocks B B'. In this manner the dies can be adjusted to compensate for any wear between the rollers or for any other purpose.

The specific construction of rotary swaging mechanism above described, having as its principal features the rotating head carrying the die-blocks and surrounded by a set of rollers adapted to come into contact with rollers $b^2$ for imparting the swaging stroke to the dies and the special adjustment of the dies, is an improvement over the rotary swaging devices heretofore used, in that there is much less friction and wear between the parts, and consequently less power is required to drive the same.

As the wire stock is fed forward by suitable mechanism, to be presently described, it passes through one of the notches $a^5$, which at this instant registers with the line of feed $x\,x$, and pushes its way between the flared ends of the recesses in the dies $b\,b'$, forcing the latter apart until it has entered to the proper distance. After remaining in this position for a period sufficient to complete the swaging operation the blank is withdrawn, and the pawl $a^4$ is at this instant operated to move the wheel A through the distance of one tooth of the ratchet-wheel $a^3$, bringing one of the openings $a'$ into register with line $x\,x$. The blank is now again fed forward, passing through an opening in a cutter-lever $d$, pivoted at $d'$ and carrying at its end a roller $d^4$, running on the periphery of cam-wheel $d^2$ on shaft C. Cam $d^2$ moves lever $d$, causing it to cut off a blank of suitable length, about equal to the thickness of the cutter-lever, by a shearing action against the face of bushing $d^3$. The wire stock now advances a short distance, pushing the severed blank into the opening $a'$ of carrier A. Wheel A is now rotated another step, and the same operations are repeated, finally depositing in the next opening $a'$ another blank having a swaged end.

The blanks above referred to are preferably formed from a continuous wire fed into the machine on the line $x\,x$. The mechanism for effecting such feed and which has been heretofore referred to is as follows: Referring to Figs. 1, 7, and 8, $e'$ is a slide upon which is mounted a jaw or gripping-block $e$, above which is located a corresponding jaw $e$ on the end of a lever E. In order that the slide may follow the lever E in its horizontal reciprocation, a pin $e^2$ passes loosely through the lever and upper jaw $e$, through the lower jaw, and into the slide. Pin $e^2$ has an opening $e^3$, through which the wire freely passes. (See Fig. 7.) Lever E is pivoted at $e^4$ to a block $e^5$, which latter is also pivoted to swing on the points $e^6 e^6$, thus providing for universal movement of the lever. At its outer end the lever engages a cam-groove $f$ in the periphery of wheel $f'$, also mounted on shaft C. The bottom of said groove has an elevated portion $f^2$, which effects the closing of the jaws and consequently the gripping of the wire between them, and the whole contour of the groove is such as to first operate the lever E, swinging it on points $e^6$ to grip the wire, then moving the lever on its pivot $e^4$ to advance the wire to the swaging-dies, then retracting it to permit of the rotation of the wheel A to bring the opening $a'$ to register with the line $x\,x$, again advancing the wire to the cutter, at which instant the swaged blank is severed from the wire stock, and finally advancing the stock to push the severed blank into one of the openings $a'$. The depressed portion of the groove now comes under the end of lever E, permitting the jaws $e$ to open and release the wire, at which instant an inclined portion of the groove moves the jaws to the left, Fig. 1, and a new grip is taken upon the wire to feed a sufficient length forward to form the next blank. The movements above detailed are then repeated.

Having thus described how the blanks (see Fig. 13) having a swaged portion at one end are continuously formed from a wire and supplied to the carrier A, I next come to the mechanism for pointing the swaged ends of the blanks.

The pointing mechanism has a cutter $g$, of any suitable type, carried at the end of a shaft $g'$, mounted on a carriage $g^2$ and driven by a pulley $g^3$ from a shaft overhead. The carriage $g^2$ is moved in its slides by means of a projection thereon engaging a cam-wheel $g^4$, carried by a shaft G, gearing with shaft C. By such means the cutter is advanced at the proper time to point the swaged ends of the blanks while they are held by the carrier A and successively brought into position.

Next comes the heading operation. After the pointing has been effected and the disk carrier A advances several steps the pointed swaged blank is brought into position to be transferred to a swinging auxiliary carrier H, mounted on one end of a shaft $h$, the latter having a slotted arm $h'$ engaged by a pin $h^2$ on a slide $h^3$, actuated by a cam-wheel $h^4$ on shaft G. The carrier H is provided with two flat springs $h^5$ $h^6$, between the ends of which the blank is adapted to be gripped and held, as shown in Figs. 9 and 10.

The delivery of the blank from the carrier A to the carrier H is effected by a lever I, pivoted at $i$, lying at one end in the path of projection $i'$ on the disk carrier A and carrying at its other end a pin $i^2$, adapted to engage and push the blanks out of the openings $a'$ as the lever is actuated by projections $i'$. At the instant the blank is forced out of opening $a'$ the carrier H occupies the position shown in full lines in Fig. 10, resting against stop $h^7$, and the blank pushes its way between the ends of springs $h^5$ and $h^6$. Carrier H then swings to the position indicated in dotted lines in Figs. 2 and 10 for delivering the blank to the heading mechanism, which is of the well-known double-stroke type.

Referring to Figs. 1 and 3, $k$ $k'$ represent hammers or heading-dies arranged one above the other on a slide K, adapted to be raised and lowered to bring the hammers into position by means of lever $k^2$, pivoted at one end at $k^3$ and having at one side a roller $k^4$, engaging in a slot $k^5$ in slide $l$. The working stroke is imparted to the hammers $k$ $k'$ by a slide M, actuated from a crank N through pitman N' and a toggle-joint $N^2$. Crank N is driven by a pulley $o$ and communicates motion to shaft C through gears $o'$ $o^2$ $o^3$, shaft O, and gears $o^4$ $o^5$. Slide $l$ is connected with and operated from pitman N' by a link $l'$. It will be understood that for each rotation of the crank N two hammering strokes are given, one by the hammer $k'$ and another by hammer $k$, thus forming a head on the swaged and pointed blank.

During the formation of the head the swaged portion of the blank projects into an opening $p$ in an anvil-block $p'$, which receives the impact of the strokes of the hammers, the pointed end of the blank resting in a corresponding recess in the end of a rod $p^2$, projecting into opening $p$ from the opposite direction. Rod $p^2$ is adjustable in accordance with the length of the stem of the finished tack by means of a set-bolt $p^3$, sliding loosely in a lug $p^4$ on the framework, and is moved forwardly by means of a cam $p^5$ on shaft G to discharge the finished article.

When the carrier H, holding a swaged and pointed blank, reaches the position shown in Fig. 2 before the opening $p$ in the anvil-block $p'$, one of the hammers advances, pushing the pointed end of the blank into the opening. At this instant the return movement of carrier H commences and the pull on the blank causes springs $h^5$ $h^6$ to release the same. (See Fig. 9.) The heading is next completed and the finished article ejected by rod $p^2$, as above described. These operations are repeated as the blanks are successively delivered to the heading mechanism.

It will be understood, of course, that the several operations and movements of the parts above described are so timed and regulated that the blanks cut from a continuous wire are successively and continuously subjected to the several steps, being finally delivered from the machine in their finished form, (see Fig. 13,) the entire operation being automatically performed.

It will be understood that departure in matters of construction of the various parts of the machine may be made within wide limits without departing from the spirit of the invention.

What I claim as new, and desire to secure by Letters Patent, is—

1. In a machine for making tacks or rivets, the combination of swaging devices, heading devices, feeding devices, for supplying the stock to the swaging devices, means for transferring the blanks from the swaging devices to the heading devices, and actuating mechanism for the specified elements, substantially as described.

2. In a machine for making tacks or rivets, the combination of swaging-dies, means for feeding a blank between the dies, an intermittently-operating carrier for the swaged blank, a heading device independent of the swaging-dies, and actuating mechanism for the dies, carrier, and heading device, substantially as described.

3. The combination of the swaging-dies, means for feeding a blank between the dies, a disk-shaped carrier having a series of receptacles for the blanks, means for advancing the carrier intermittently while the swaging-dies are out of action, a heading device independent of the swaging-dies, means for delivering the blanks successively to the heading device, and actuating mechanism for the several parts, substantially as described.

4. The combination of the swaging-dies, means for feeding the wire stock between said dies, a cutter, means for actuating said cutter, a carrier, means for delivering the severed blank to the carrier, and heading mechanism independent of the swaging-dies, substantially as described.

5. In a machine for making tacks and rivets, the combination of swaging-dies, means for feeding a blank between the dies, an intermittently-operating carrier for the swaged blank, a pointing device, a heading device independent of the swaging-dies, and actuating mechanism for the dies, carrier, and pointing and heading devices, substantially as described.

6. The combination of the swaging-dies, means for feeding blanks between the dies, a disk-shaped carrier having a series of receptacles for the blanks, means for advancing the carrier intermittently, a heading device, an auxiliary carrier for delivering the blanks from the disk carrier to the heading device, and means for transferring the blanks from one carrier to the other, substantially as described.

7. The combination of swaging-dies and actuating mechanism therefor, a carrier adjacent to said dies, means for intermittently moving said carrier, a feeding device for feeding the wire stock to the swaging-dies and to the carrier, a cutter for severing a blank from the stock, a pointing device, and a heading device, substantially as described.

In testimony whereof I have signed this specification in the presence of two subscribing witnesses.

WILLIAM G. ALLEN.

Witnesses:
G. J. CAPEWELL,
HARRY R. BOARDMAN.